Dec. 8, 1931.  W. DYRSSEN  1,835,210
REGENERATIVE HEATING SYSTEM
Filed July 15, 1930  2 Sheets-Sheet 1

INVENTOR

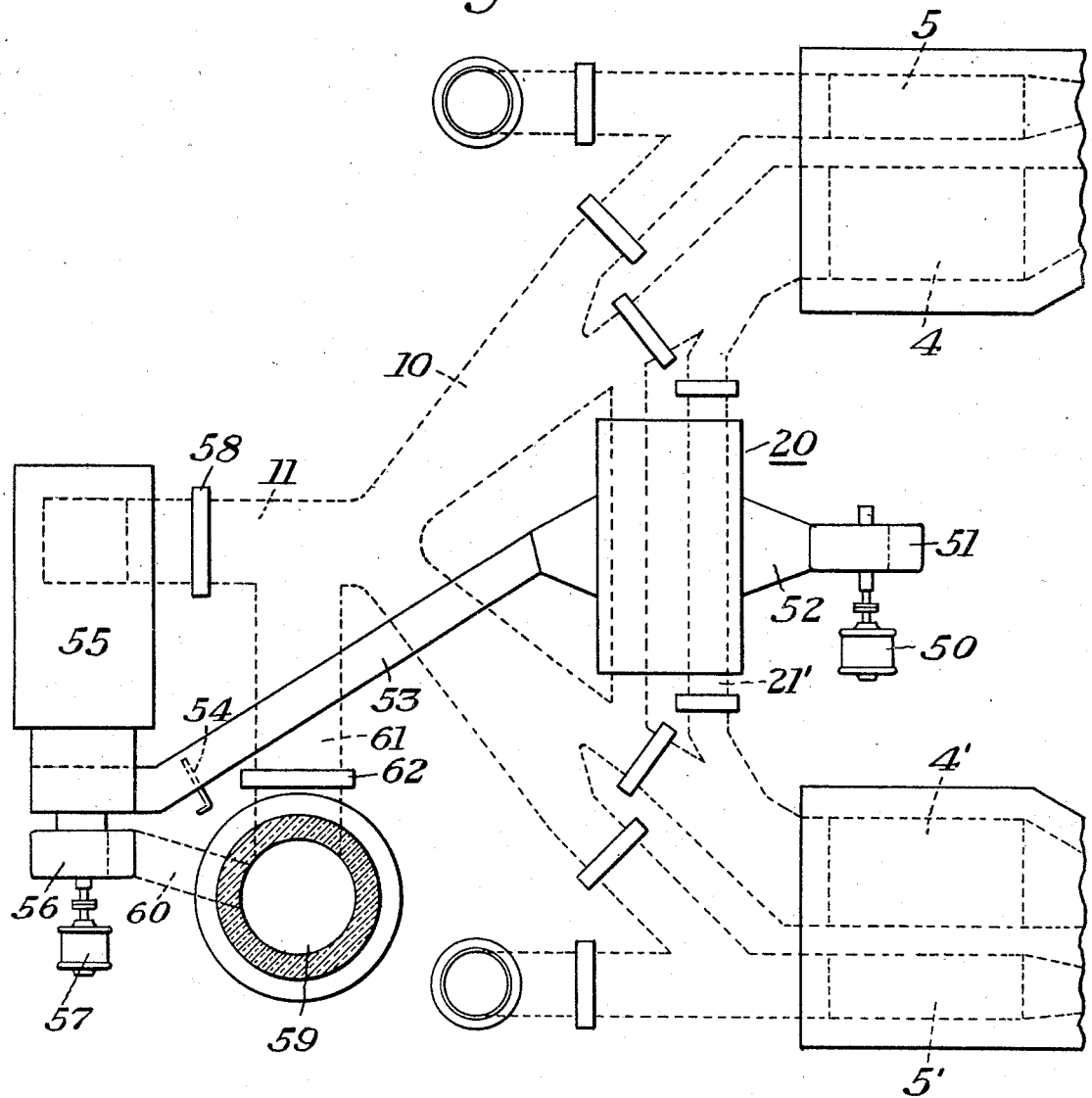

Patented Dec. 8, 1931

1,835,210

UNITED STATES PATENT OFFICE

WALDEMAR DYRSSEN, DECEASED, LATE OF O'HARA TOWNSHIP, ALLEGHENY COUNTY, PENNSYLVANIA, BY PEOPLES-PITTSBURGH TRUST COMPANY, ADMINISTRATOR, OF PITTSBURGH, PENNSYLVANIA, ASSIGNOR TO BLAW-KNOX COMPANY, OF BLAWNOX, PENNSYLVANIA, A CORPORATION OF NEW JERSEY

REGENERATIVE HEATING SYSTEM

Application filed July 15, 1930, Serial No. 468,019, and in Great Britain June 28, 1928.

This invention relates generally to regenerative heating systems and more particularly to such systems provided with a preheater and a waste heat boiler so disposed as to render the operation of the entire system very efficient. The present invention is a continuation in part of Dyrssen application, Serial No. 274,221, filed May 1, 1928.

By "regenerative furnaces" is meant that type of furnace in which the waste gases leaving the melting or heating chamber are passed through so-called "checkers", or checker chambers, wherein the gases give a part of their heat to bricks with which the checker chambers are filled. After a certain period of time, say about twenty minutes, the flow of gases in the furnace system is reversed so that the air which is used for combustion enters the checker chamber which has been previously heated by the outflowing waste gases of the previous step. In passing through the checker chambers, the air is heated before it comes in contact with the fuel at the entrance of the melting chamber. Upon the reversal of the furnace, the waste gases pass out from the heating chamber at the opposite end of the melting furnace and pass to other checker chambers where they again give up a part of their heat.

It is old in the art to which this invention relates to utilize a waste heat boiler in conjunction with a regenerative furnace. It also is old to utilize a preheater in conjunction with a regenerative furnace, the preheater being so disposed that all of the waste heat gases coming from the checker chamber pass through the preheater. In accordance with the present invention, however, the preheater and boiler are so disposed that a portion of the waste gases coming from the checker chamber may be passed through the boiler and delivered to a stack, and another portion of the waste gases from the checker chamber is passed through the preheater. The exit gases from the preheater are delivered to the stack without passing through the boiler. When such an arrangement is used, the boiler and preheater is described as being in parallelism with respect to the waste gases leaving the checker chamber. The advantages of this arrangement are hereinafter more fully described.

In the accompanying drawings, which illustrate two embodiments of the invention, Figure 1 is a diagrammatic plan view of a regenerative heating system, showing the arrangement of the preheater and boiler relative to a regenerative furnace of the open hearth type;

Figure 3 is a partial view, similar to Figure 1, but showing a modification.

Figure 1:
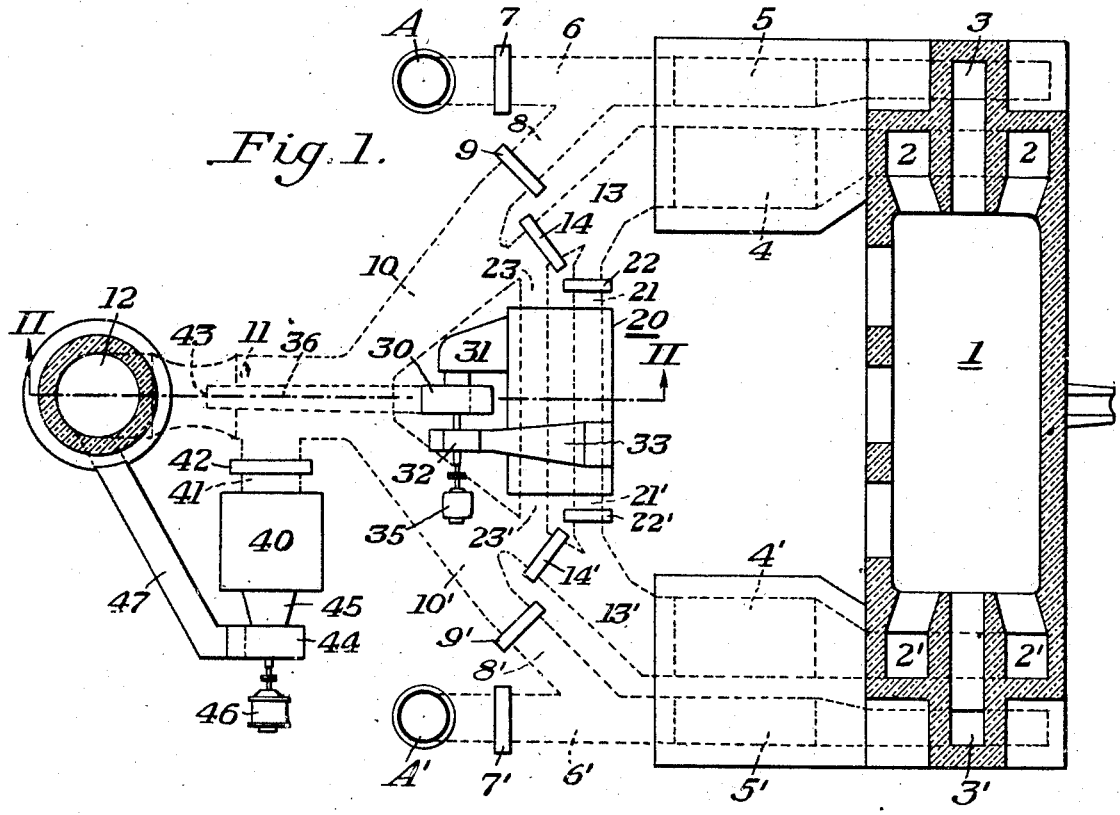
Figure 2:
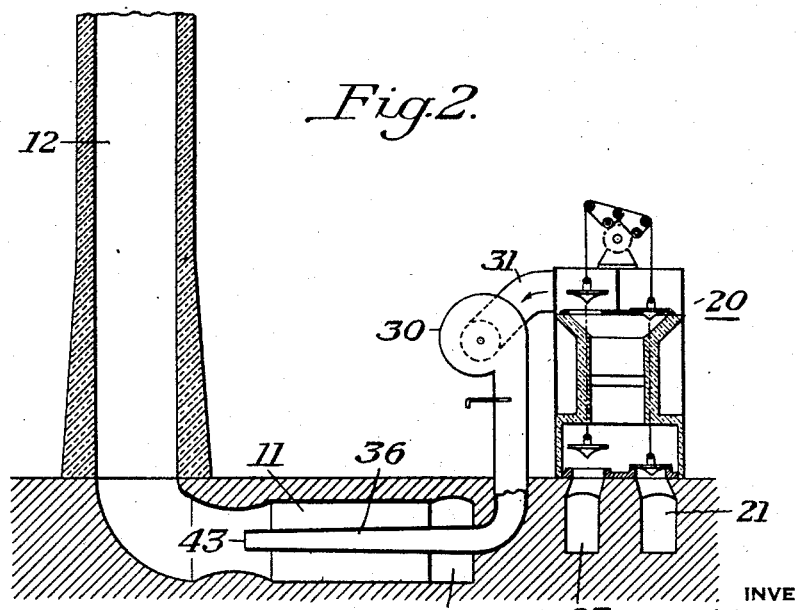
Figure 2 is a sectional view on the line II—II of Figure 1.

Referring more particularly to Figures 1 and 2, an open hearth furnace 1 of the usual type is provided with air slag pockets 2 and 2', gas slag pockets 3 and 3', air checker chambers 4 and 4' and gas checker chambers 5 and 5'. Gas flues 6 and 6' provided with dampers 7 and 7' are adapted to supply gaseous fuel admitted into the conduits A and A' to the gas checker chambers and thence to the open hearth furnace. Flues 8 and 8' controlled by dampers 9 and 9' connect flues 6 and 6' with flues 10 and 10'. The flues 10 and 10' join to form a stack flue 11 which connects with a stack 12. Flues 13 and 13', controlled by valves 14 and 14', connect the air checker chambers 4 and 4' with the flues 10 and 10'.

A preheater, indicated generally by the reference numeral 20, is connected to the system as shown in Figure 1, the preheater having flues 21 and 21' through which air which has been heated in the preheater is supplied to the air checkers 4 and 4'. The flues 21 and 21' are provided with dampers 22 and 22' to regulate the quantity of air supplied to the checkers. The preheater 20 also has flues 23 and 23' through which waste heat gases coming from the checker chambers are diverted from the flues 10 and 10' into the preheater, the waste gases flowing into the preheater through either of the flues 23 or 23' being utilized to heat the air which is delivered to either of the conduits 21 or 21' from the preheater.

The preheater is provided with an exhauster 30 connected to the preheater by a flue 31 and also is provided with a fan 32 connected to the preheater by a flue 33. In this embodiment, both the exhauster 30 and the fan 32 are rotated by the same motor 35. The waste gases drawn into the preheater through the flue 23 transfers some of its heat to the cold air drawn into the preheater by the fan 32, and the cooled exit gases from the preheater are delivered by a discharge pipe 36 into the stack flue 11. The cold air drawn into the preheater by the fan 32 is heated by the waste gases drawn into the preheater through the flue 23, and the heated fresh air flows past the valve 22' to the air checker chamber 4' and from thence to the furnace 1.

A waste heat boiler 40 is connected by a flue 41 controlled by a damper 42 to the stack flue 11. The junction point of the flues 41 and 11 is farther away from the stack 12 than the discharge end 43 of the outlet pipe 36 so that the cooled gases discharging from the outlet pipe 36 will pass to the stack without passing through the boiler. Gases are withdrawn from the stack flue 11 and passed through the boiler 40 by means of a fan 44 connected to the boiler by a flue 45, the fan being rotated by a motor 46. The fan discharges the gases which have passed through the boiler into a flue 47 from which they are delivered to the stack 12.

In the operation of the furnace, when the flow of combustion gas and air is upwardly through the furnace 1, as viewed in Figure 1, the valves 7', 9, 14, and 22' are in open position while the valves 9', 14', 22, and 7 are closed. Combustion gas is supplied to the furnace 1 from conduit A' through flue 6' and gas checker chamber 5', and atmospheric air is drawn into the preheater 20 by the fan 32 and forced through flues 33 and 13', and air checker chamber 4', from which it is delivered to the furnace.

The waste gases from the upper end of furnace 1 flow through checkers 4 and 5 and flues 8 and 13 into flue 10. A portion of the waste heat gases in flue 10 is drawn into the preheater through flue 23 by means of the exhauster 30 and after having been cooled in the preheater is delivered through discharge pipe 36 into the stack flue 11. The portion of the waste heat gases in flue 10 which does not pass through the preheater flows into the stack flue 11. The portion of the gases not passed through the preheater is at a considerably higher temperature than the exit gases discharging through the discharge pipe 36. A portion or all of the gases not passed through the preheater is withdrawn from the flue 11 and passed through the boiler 40 by means of the fan 44. The proportion of gases drawn through the boiler is controlled by the damper 42. After passing through the boiler, the gases are delivered to the stack 12 through the flue 47.

When the furnace is reversed, the valves are reversed so as to cause flow of combustion gas and air through the furnace downwardly as viewed in Figure 1. Fresh air is drawn into the preheater 20 by fan 32 and after having been heated in the preheater flows through flues 21 and 13, and checker chamber 4 to the upper end of the furnace. Combustion gas is supplied from conduit A through flue 6 and gas checker chamber 5 to the upper end of the furnace.

The waste heat gases coming from checkers 4' and 5' flow through flues 13' and 8' into flue 10'. A portion of the gases in flue 10' is drawn through preheater 20 by exhauster 30 through flues 23' and 31, and is delivered from the preheater through discharge pipe 36. The portion of gases in flue 10' not passed through the preheater flows into stack flue 11. The passage of gases from flue 11 through boiler 40 is the same as previously described.

Referring to the embodiment shown in Figure 3, the system is generally similar to that above described. However, instead of using a single motor 35 for driving both the exhauster and the intake fan for the preheater and mounting both the exhauster and intake fan on the same shaft, in its embodiment two separate motors are employed. A motor 50 rotates a fan 51 which forces air into the preheater 20 through a flue 52. This air is heated in the preheater and flows through flue 21' to the air checker chamber 4'. The waste gases withdrawn from flue 10 after having passed through the preheater are discharged through a flue 53 controlled by a damper 54 to the outlet end of a boiler 55. The flow of gases through the flue 53 is accomplished by a fan 56 rotated by a motor 57.

The portion of the waste gases in flue 10 which are not passed through the preheater flow into stack flue 11 controlled by damper 58 and are delivered to the boiler 55. After the gases have passed through the boiler, they are passed to a stack 59 through a flue 60.

The stack 59 is connected to the flue 11 by a flue 61 controlled by a damper 62. When the waste heat gases from the checker chambers 4 and 5 are used in the boiler 55, the damper 62 is closed to prevent direct passage of the gases from the flue 11 to the stack 59. When it is not desired to pass the waste gases through the boiler, the damper 58 is closed and the damper 62 is opened, thereby causing direct passage of the gases in flue 11 to the stack.

It will be seen that in either of the above described embodiments a portion of the waste gases in the flue 10 is passed through the preheater 20 in order to heat incoming air and also that the exit gases from the preheater are bypassed around the boiler to the stack. Either all or a portion of the waste gases not passed through the preheater 20 is passed through the waste heat boiler to develop steam. In some of the claims, we have stated that the boiler and preheater are in parallelism with respect to the gases leaving the checker chamber. This expression "in parallelism" has been adopted by anology from the electrical art to denote an arrangement in which the portion of the gases passed through the preheater is bypassed around the boiler and in which either all or a portion of the gases not passed through the preheater are utilized in the boiler.

This arrangement of the boiler and preheater "in parallelism" has several advantages over simply disposing a waste heat boiler between the stack and a preheater in which all of the waste gases coming from the checkers pass through the preheater. A preheater arranged according to the invention in a regenerative heating system results in a reduction in the size of the checkers over that which it would be necessary to employ if no preheater was used, or if a preheater was employed in which all of the waste gases coming from the checker chambers are passed through the preheater. With a preheater arranged so that all of the gases coming from the checker chamber pass through the preheater, there is danger of burning out the plates in the preheater unless the checker chambers are made very large. When a preheater is connected in accordance with this invention, a regulable portion of the gases in flue 10 can be passed through the preheater. It is not necessary to pass all of the gases through the preheater and this decreases the danger of burning out the plates of the preheater. Accordingly, when a preheater is connected in accordance with the present invention, the checker chambers may be made smaller without danger of burning out the plates of the preheater. The waste gases coming from the smaller checker chambers is at a relatively high temperature and this high temperature results in more efficient boiler operation and a reduction in size of the boiler. The gas leaving the checkers in the present system is at a higher temperature than that at which it leaves the checkers in an ordinary furnace, and the exit gas from the preheater is at a lower temperature than that at which it leaves an ordinary furnace.

In order to illustrate the advantages of the present system, the following specific statements of the temperatures which are likely to be used with different equipment are given. Where no preheater is used the temperature where the gases emerge from the checkers usually ranges between 1100 and 1300 degrees F. There is a drop of temperature between the checkers and the boiler due to leakage, radiation, and the water cooling of valves so that the gas entering the boiler will be from 1000 to 1200 degrees F. The temperature after leaving the boiler is usually around 500 degrees. When a preheater is connected to the system in accordance with the present invention, the temperature of the gases emerging from the checkers may be 1700 or 1800 degrees F., and there is a drop of about 100 degrees in the passage to the boiler so that the gases will enter the boiler at from 1600 to 1700 degrees F. or about 500 degrees higher than where no preheater is used. Since the gas enters the boiler at 500 degrees higher temperature when the preheater is used, the temperature drop in the boiler will be about 500 degrees more than in the usual installation.

When a preheater is installed, the proportion of waste gases passing through the preheater is estimated to be ordinarily about 55% of the total gas flowing, which leaves about 45% of the gas to pass through the boiler. Thus it is seen that the total steam production using only somewhat less than half of the volume of combustion gases in the boiler will be about the same as when all of the gases are passed through the boiler at the lower temperature that obtains when a preheater is not used. The present arrangement, accordingly, enables the use of a boiler of a considerable reduced size.

Two arrangements of preheater and waste heat boiler as applied to regenerative heating systems of the open hearth furnace type are described. However, the arrangement of the preheater and boiler "in parallelism" can be used with other types of regenerative furnaces.

Two embodiments of the invention are illustrated and described. It is to be understood, however, that the invention may be otherwise embodied within the scope of the following claims.

What is claimed is:

1. The combination with a regenerative heating system including a checker chamber, of a preheater and a boiler, the boiler being disposed in parallelism with the preheater with respect to the waste gases leaving the checker chamber.

2. In a regenerative heating system including a checker chamber, a preheater, a waste heat boiler, means for passing a portion of the waste gases from the checker chamber through the preheater, means for passing another portion of the waste gases from the checker chamber to the boiler, and means for bypassing the exit gases from the preheater past the boiler.

3. In a regenerative heating system, including a checker chamber, a preheater, a waste heat boiler, means for passing a regulable portion of the waste gases from the checker chamber through the preheater, means for passing another portion of the waste gases from the checker chamber to the boiler, and means for bypassing the exit gases from the preheater past the boiler.

4. In a regenerative heating system, including a checker chamber, a preheater, a boiler, a stack, means for conducting a portion of the waste gases from the checker chamber through the boiler to the stack, and means for conducting another portion of the waste gases from the checker chamber through the preheater and bypassing the exit gases from the preheater past the boiler and delivering it to the stack.

5. In combination with a regenerative heating system including a checker chamber, a preheater, a boiler, a stack, a stack flue connecting the checker chamber and stack, means for withdrawing a regulable portion of the gases from the stack flue and passing it through the boiler, means for passing a portion of the waste gases from the checker chamber through the preheater, and means for bypassing the exit gases from the preheater past the boiler and delivering it to the stack.

6. In combination with a regenerative heating system including a checker chamber, a preheater, a boiler, a stack, a stack flue connecting the checker chamber and stack, a boiler flue connecting the boiler with the stack flue, a fan adapted to withdraw a portion of the gases in the stack flue and pass them through the boiler, a preheater flue connecting the stack flue and preheater, a second fan adapted to withdraw a portion of the gases in the stack flue and pass them through the preheater, and means for delivering the exit gases from the preheater to the stack without passing through the boiler.

7. In combination with a regenerative heating system including a checker chamber, a preheater, a boiler, a stack, a stack flue connecting the checker chamber and stack, a boiler flue connecting the boiler with the stack flue, a fan adapted to withdraw a portion of the gases in the stack flue and pass them through the boiler, a preheater flue connecting the stack flue and preheater, a second fan adapted to withdraw a portion of the gases in the stack flue and pass them through the preheater, and a discharge pipe for the preheater disposed in the stack flue and extending to a point nearer the stack than the boiler flue.

8. In a regenerative heating system including a furnace and a checker chamber, a preheater, a waste heat boiler, the boiler and preheater being disposed in parallelism with respect to the waste gases coming from the checker chamber, means for forcing fresh air through the preheater and checker chamber to be delivered to the furnace, means for passing a portion of the waste gases from the checker chamber through the boiler, means for passing another portion of the waste heat gases from the checker chamber through the preheater and delivering the exit gases from the preheater to the outlet end of the boiler.

9. In a regenerative heating system including a furnace and a checker chamber, a preheater, a waste heat boiler, a stack, a flue for conducting waste gases from the checker chamber through the boiler to the stack, a fan for aiding passage of the gases through the boiler, a second flue connecting the preheater outlet and the boiler outlet, said second flue having a damper for controlling the flow of gases through the preheater, and other flues connecting said flue and said second flue with the stack, said flue and said second flue being disposed in parallelism with respect to the gases coming from the checker chamber.

In testimony whereof I have hereunto set my hand.

PEOPLES-PITTSBURGH TRUST COMPANY,
*Administrator of the Estate of Waldemar Dyrssen, Deceased.*
By MOORHEAD B. HOLLAND,
*Trust Officer.*